US010800375B2

(12) United States Patent
Rouhana

(10) Patent No.: US 10,800,375 B2
(45) Date of Patent: Oct. 13, 2020

(54) ENERGY ABSORBING SEAT BELT RETRACTOR

(71) Applicant: Ford Global Technologies, LLC, Dearborn, MI (US)

(72) Inventor: Stephen William Rouhana, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 121 days.

(21) Appl. No.: 16/043,463

(22) Filed: Jul. 24, 2018

(65) Prior Publication Data

US 2018/0326943 A1 Nov. 15, 2018

Related U.S. Application Data

(62) Division of application No. 14/184,221, filed on Feb. 19, 2014, now Pat. No. 10,053,050.

(51) Int. Cl.
*B60R 22/40* (2006.01)
*B60R 22/34* (2006.01)
*B60R 22/28* (2006.01)

(52) U.S. Cl.
CPC ........ *B60R 22/3413* (2013.01); *B60R 22/341* (2013.01); *B60R 2022/285* (2013.01); *B60R 2022/288* (2013.01)

(58) Field of Classification Search
CPC .............. B60R 22/341; B60R 22/3413; B60R 2022/285; B60R 2022/288
See application file for complete search history.

(56) References Cited

U.S. PATENT DOCUMENTS

| 4,106,721 | A | 8/1978 | Ulrich |
| 5,071,194 | A | 12/1991 | Fohl |
| 6,299,092 | B1 | 10/2001 | Smithson et al. |
| 6,705,558 | B2 | 3/2004 | Specht et al. |
| 6,769,716 | B2 | 8/2004 | Rouhana et al. |
| 6,773,075 | B2 | 8/2004 | Rouhana et al. |
| 6,834,822 | B2 | 10/2004 | Koning |
| 7,513,575 | B1 | 4/2009 | Go et al. |
| 2006/0214043 | A1 | 9/2006 | Yasuaki |
| 2008/0231035 | A1 | 9/2008 | Breitschuh |
| 2012/0303219 | A1 | 11/2012 | Osada et al. |
| 2013/0001348 | A1 | 1/2013 | Gormley |

*Primary Examiner* — Sang K Kim
(74) *Attorney, Agent, or Firm* — Frank MacKenzie; Burgess Law Office, PLLC

(57) ABSTRACT

An energy absorbing seat belt retractor used with a seat belt assembly of a motor vehicle. The seat belt retractor includes a reel for winding and unwinding the seat belt and an elongated shaft, with the reel attached to the shaft. In one example, a movable disc is connected to and moves longitudinally along the shaft. At least one of the reel or movable disc includes a friction layer providing a friction surface such that when the movable disc is driven axially toward the reel there is frictional engagement between the reel and movable disc that absorbs impact energy on the occupant and limits the load applied to the seat belt.

15 Claims, 6 Drawing Sheets

ENERGY ABSORBING SEAT BELT RETRACTOR

CROSS-REFERENCE TO RELATED APPLICATIONS

Not Applicable.

BACKGROUND OF THE INVENTION

1. Field of the Invention

The present invention relates generally to a seat belt system for restraining an occupant of a vehicle and, more particularly, to a seat belt retractor including an energy absorbing mechanism.

2. Description of Related Art

Automobiles typically include seat belts or restraint systems for restraining a vehicle occupant in their seat during rapid deceleration of a vehicle from a cause such as a collision. Various types of seat belts or restraint systems using a seat belt retractor are commonly used. One type of seat belt retractor includes a spool or reel used to wind up and store the webbing of a seat belt. The spool or reel locks in place to prevent further unwinding of the seat belt during a rapid deceleration of a vehicle to restrain the vehicle occupant.

The retractor may include an energy absorbing mechanism such as a torsion bar that permits the spool or reel to rotate and let out an additional amount of seat belt in response to a load placed on the seat belt by the occupant. The forward motion of the occupant puts a load on the torsion bar allowing the spool or reel to rotate twisting the torsion bar whereby the restraint force on the occupant is limited by routing the forces through the torsion bar to form said predefined seat belt load.

SUMMARY OF THE INVENTION

An embodiment of the present invention provides an energy absorbing seat belt assembly used with a motor vehicle. The seat belt assembly includes a reel for winding and unwinding the seat belt and an elongated shaft with the reel connected to the shaft. In one example, a disc connects to and rotates with the shaft; the disc is connected to the shaft in a manner wherein it can move longitudinally along the shaft. The disc includes a friction layer providing a friction surface such that when the disk moves axially along the shaft toward the reel there is frictional engagement between the disc and reel.

The embodiment further includes multiple layers of friction material. Each layer formed of a different friction material having a different coefficient of friction; each layer may have a different shear, tensile or compressive property; each layer may have a different surface area; and each layer may have different radial and axial thicknesses resulting in a multilayer friction surface having different annular configurations.

Further areas of applicability of the present invention will become apparent from the detailed description provided. It should be understood that the detailed description and specific examples, while indicating the preferred embodiment of the invention, are intended for illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary and is not intended to limit the invention, its application, or uses.

Figure 1:
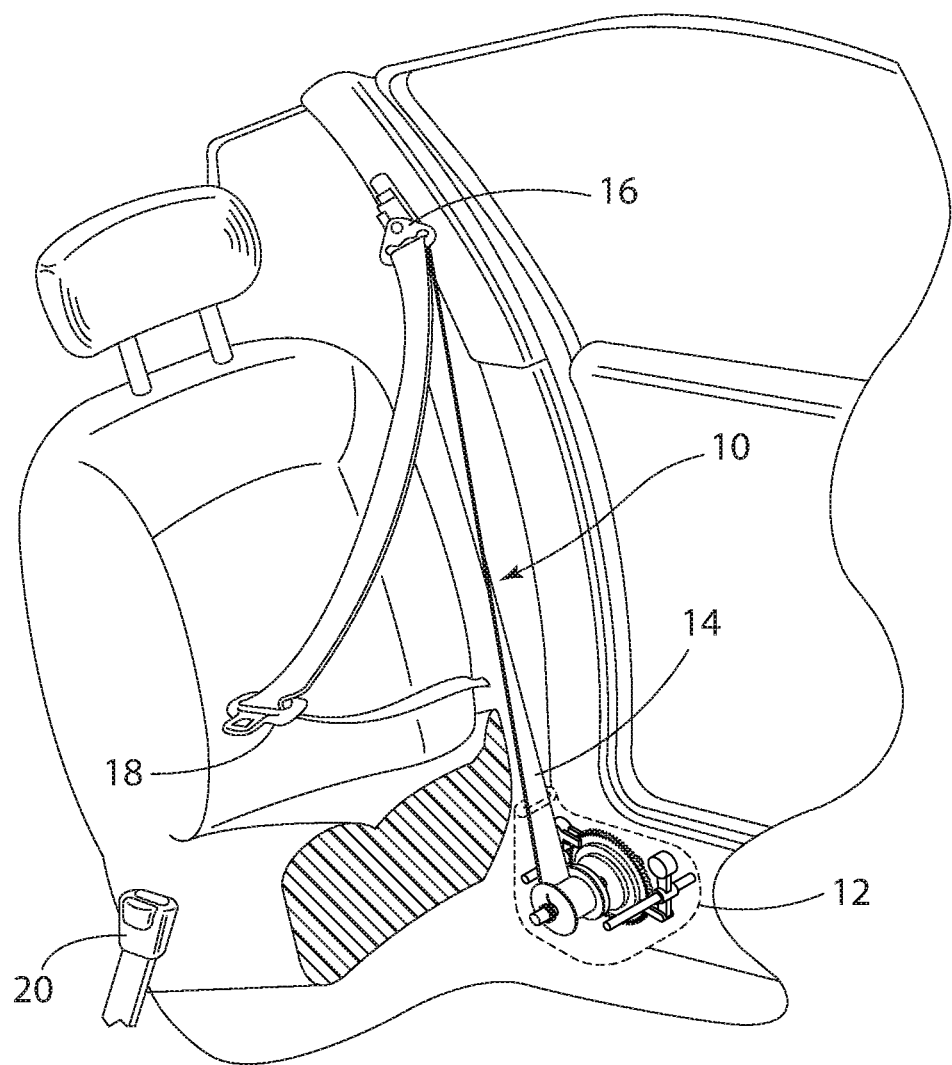
FIG. 1 is a perspective overview of a seat belt assembly incorporating a seat belt retractor according to the present invention.

FIG. 1 illustrates a seat belt system, seen generally at 10. The seat belt system includes a seat belt retractor 12. The seat belt retractor 12 typically operates to wind and unwind the seat belt 14 as the vehicle occupant pulls out and releases the seat belt 14. It operates to take up slack in the seat belt 14; and during periods of rapid deceleration, for example a collision, to lock and prevent extraction of the seat belt 14. As illustrated, the seat belt 14 passes through a D-ring 16 and a tongue 18. The tongue 18 is freely slidable along the seat belt 14 and connects the seat belt 14 to a buckle 20. The end of the seat belt 14, opposite of the retractor 12, is fixed or anchored to the base/frame of the vehicle. As illustrated, the seat belt retractor 12 is mounted to the vehicle body near the B-pillar. The foregoing description of a seat belt system 10 is for background only; the seat belt retractor 12 according to the disclosed example of the present invention can be used in other types of seat belt systems using seat belt retractors.

Figure 2:
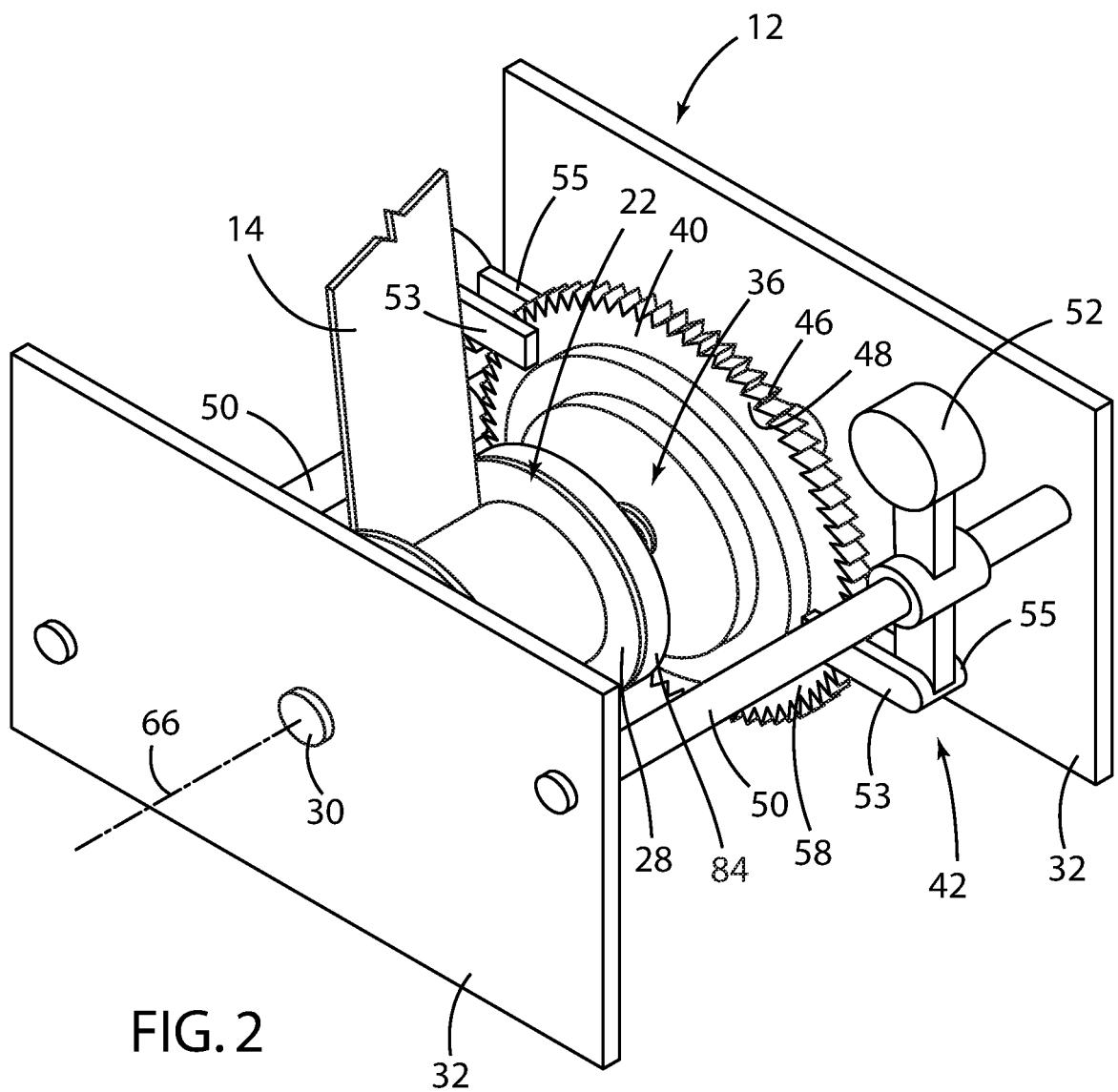
FIG. 2 is a schematic perspective view of a seat belt retractor having an energy absorbing mechanism according to the present invention.
Figure 3:
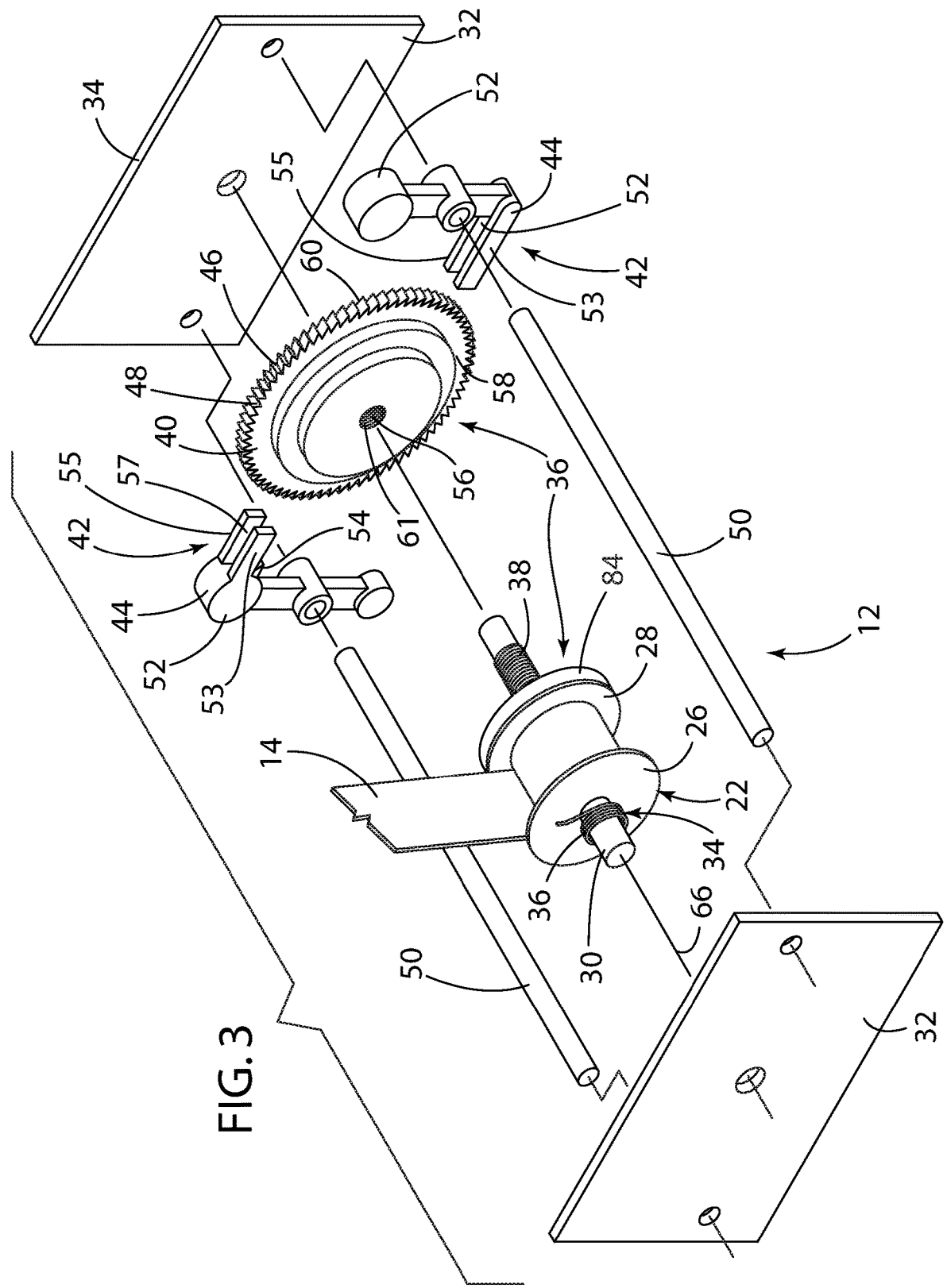
FIG. 3 is an exploded perspective view of the seat belt retractor having an energy absorbing mechanism as set forth in FIG. 2.
Figure 4:
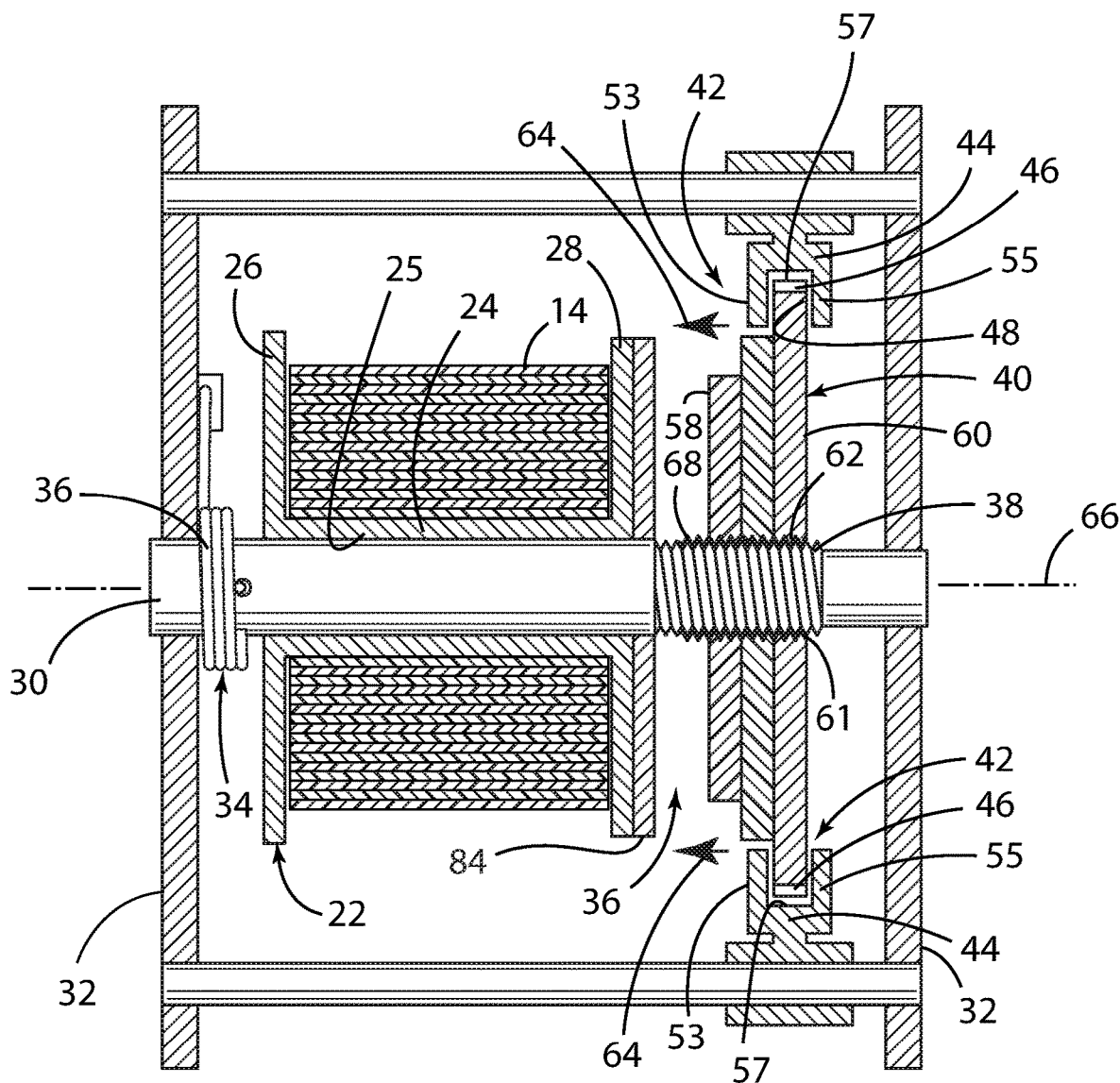
FIG. 4 is a schematic cross-sectional side view of the seat belt retractor having an energy absorbing mechanism as set forth in FIG. 2.

FIGS. 2-4 illustrate an example of a seat belt retractor 12 according to the present invention including a spool or reel 22 having a cylindrical center portion 24 defining an axial hole or throughbore 25. A first radially extending flange 26 is at one end of the center portion 24 and a second radially extending flange 28 is at the opposite end of the center portion 24. The spool or reel 22 is secured to a shaft 30 extending through the axial hole or bore 25 of the spool 22. A housing 32 rotatably supports the shaft 30.

The spool 22 and respective flanges 26, 28 operate to guide the seat belt 14 during winding and unwinding of the seat belt 14. A biasing mechanism, seen generally at 34, operates to provide a retraction force on the seat belt 14. The biasing mechanism 34 may include a torsion spring 36 connected on one end to the housing 32 and on the opposite end to the shaft 30. While shown as a torsion spring 35, the biasing mechanism 34 may also include an electric motor for rotating the spool 22 in a winding or unwinding direction. As illustrated, securing the spool or reel 22 to the shaft 30 causes rotation of the shaft 30 with the spool 22 as it winds or unwinds the seat belt 14.

As illustrated, the seat belt retractor 12 also includes an energy absorbing mechanism, seen generally at 36. The energy absorbing mechanism 36 includes a threaded portion 38 of the shaft 30, a disc 40 and a clutch or engagement mechanism, seen generally at 42, that operates to couple the disc 40 to the housing 32. In the disclosed example, the clutch or engagement mechanism 42 includes a mechanical dog or pawl assembly shown as a pair of locking members 44 having guide arms 53, 55 forming a channel or slot 57. As disclosed, the disc 40 is positioned in the channel or slot 57. The locking members 44 operate to engage a plurality of gear teeth 46 on the outer peripheral edge 48 of the disc 40. The locking members 44 are slidably mounted for reciprocal movement along support rods 50. Should the vehicle come to a sudden stop inertia causes the respective pendulums 52 of the locking members 44 to swing forward or rotate about the longitudinal axis of the support rods 50 whereby a pawl 54 engages the gear teeth 46 on the disc 40 preventing rotation of the disc 40. Other clutch assemblies that positively couple or connect the disc 40 to the housing 32 while enabling lateral movement along the support rods 50 and shaft 30 are suitable. Other types of inertia locks may also be used. Electronic clutches or lockup devices receiving a signal from various vehicle sensors may also positively couple or connect the disc 42 the housing 32.

In the disclosed example, the disc 40 includes a center aperture 56 extending between the respective side surfaces 58, 60 of the disc 40. The center aperture 61 includes a plurality of threads 62 complementary to the threaded portion 38 of the shaft 30 whereby the disc 40 is threadably received on a threaded portion 38 of the shaft 30. The spool or reel 22 is fixed to the shaft 30 whereby rotation of the spool or reel 22 causes rotation of the shaft 32. When the clutch mechanism 42 holds the disc 40 stationary; i.e., prevents it from rotating with the shaft 38, continued rotation of the shaft 20 causes the disc 42 to move axially along the shaft 30 in the direction of its longitudinal axis 66, see arrows 64—FIG. 4, toward the spool or reel 22. Because the disc 40 is located between the guide arms 53, 55 of the locking members 44 movement of the disc 40 on the shaft 30 results in movement of the locking members 44 axially on the respective support rods 50 in the same direction as the disc 40. The disc 40 and locking members 44 move axially inward toward the spool or reel 22 at a rate and distance determined by the rotation of the shaft 30 and the pitch of the threaded portion 38 of the shaft 30. The shaft 30 operates as a ball screw or lead screw to move the disc 40 inward towards the spool or reel 22.

Initially the disc 40 of the energy absorbing mechanism 36 rotates with and does not move axially along the threaded portion 38 of the shaft 30. That is, the disc 40 rotates between the respective guide members 53, 55 of the locking members 44 and does not move axially along the threaded portion 38 of the shaft 30 until the locking members 44 engage the disc 40.

In the disclosed example a thread locking adhesive 68, see FIG. 4, is applied to the threaded portion 38 of the shaft 30. Initially, the threaded locking adhesive 68 maintains the disc 40 in position on the threaded portion 38 of the shaft 30. As illustrated, the threaded locking adhesive 68 is a thin layer of adhesive applied to the threaded portion 38 of the shaft 30. Various types of thread locking adhesives are known and available in formulas rated to withstand variable shear forces. Thread locking adhesives offer high shear strength, good temperature resistance, rapid cure, easy dispensing and good vibration resistance. Depending upon the type and corresponding shear force of thread locking adhesive 68 the locking members 44 may engage the disc 40 and prevent rotation of the spool 22 and corresponding payout of the seatbelt 14. In this manner, the seatbelt 14 can lock and restrain the vehicle occupant; however, depending upon the impact energy acting upon the occupant when the seatbelt 14 is locked the thread locking adhesive 68 may shear. When the adhesive 68 shears the spool 22 and shaft 30 rotate independently of the disc 40 whereby the threaded portion 38 draws the disc 40 inward into contact with the spool 22. The adhesive 68 extends along a length of the threaded portion 38 and continues to absorb energy as the disc 40 rotates on the threaded portion 38 of the shaft 30.

Figure 6:
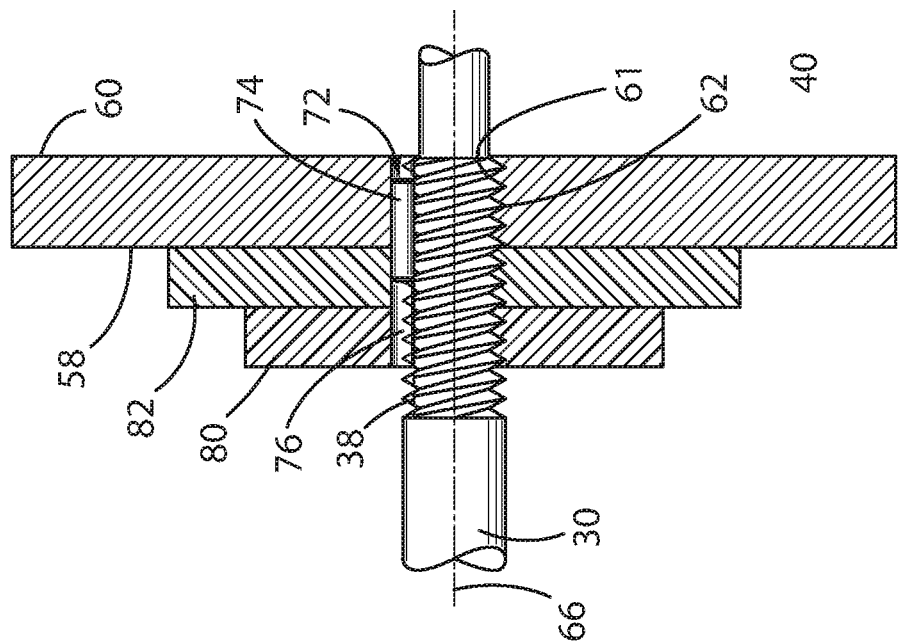
FIG. 6 is a partial cross-sectional view of the energy absorbing mechanism taken along lines 6-6 of FIG. 5.
Figure 5:
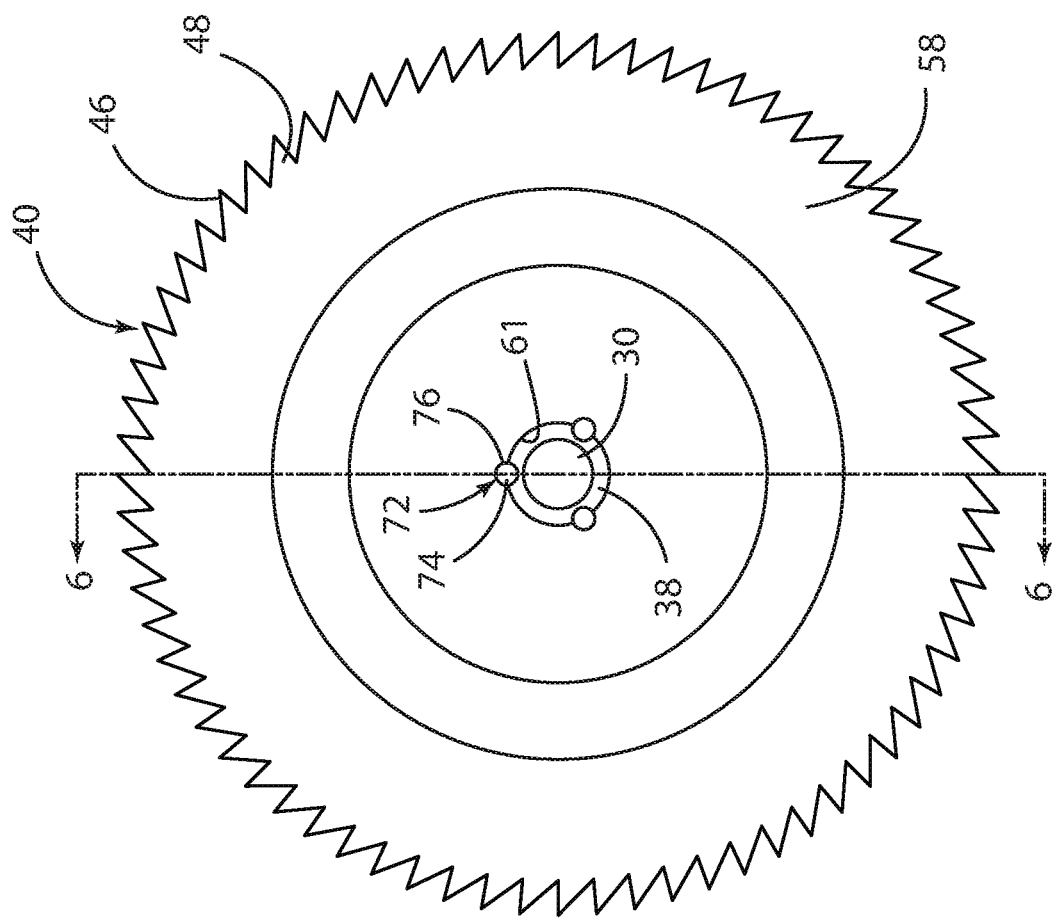
FIG. 5 is a side view of a portion of the energy absorbing mechanism as set forth in FIG. 2.

FIGS. 5-6 illustrate another example of frangible connection between the shaft 30 and disc 40. As used herein frangible is a structure or component that yields, breaks, shears or distorts upon undergoing a predetermined load. One example is a shear member designed to shear when subjected to a mechanical overload or impact. As with the previous example, the disc 40 is threadably received on the threaded portion 38 of the shaft 30. Both the threaded portion 38 of the shaft 30 and the threads 62 of the center aperture 61 contain complementary grooves or channels 70. A frangible member 72 is placed in the groove or channel 70. The frangible member 72 provides a breakaway connection between the shaft 30 and disc 40. Upon reaching a desired breakaway force or shock load the frangible member 72 breaks or shears allowing relative rotation between the threaded portion 38 of the shaft 30 and the disc 40. Relative rotation of the shaft 30 and disc 40 results in the disc 40 traveling inwardly on the threaded portion 38 of the shaft 30.

As illustrated in FIG. 6 one example of the frangible member 72 is a cylindrical/pin 74 member seated in opposed semicircular grooves 76 in the threaded portion 30 of the shaft 30 and the center aperture 61 of the disc 40. The seated, cylindrical/pin member 74 is designed to shear when the load exceeds a predetermined value. The frangible member 72 may be formed or made from different materials including polymers, wax, metal or any other material having suitable shear strength.

A further example of a frangible connection between the shaft 30 and disc 40 includes a polymer collar or annular member located or inserted between the threaded portion 38 and the threads 62 of the center aperture 61. The polymer collar or annular member provides a relatively constant force or resistance to relative rotation between the shaft 30 and disc 40. The frictional force between the respective threads 38, 62 and collar results in an additional energy absorbing mechanism that dampens and absorbs energy as the shaft 20 rotates relative to the disc 40. The collar may include a nylon insert placed in all or part of the center aperture 61 of the disc 40 wherein the inner diameter (ID) is slightly smaller than the outer diameter of the threaded portion 38 of the shaft 30. The collar deforms elastically over the threaded portion 38 of the shaft 20, but the threaded portion 38 does not cut into the material of the collar. The collar increases the friction between the disc 40 and a shaft 20 and applies a compressive force against the threaded portion 38 of the shaft 20. The collar may be formed of a suitable thermoplastic, for example nylon.

The disc 40 is threadably received on the threaded portion of the shaft 30 such that it rotates with the shaft 30. However, once the locking members 44 engage the disc 40, the disc 40 does not rotate about the longitudinal axis 64 of shaft 30 but moves laterally on the shaft 30 in the direction of the longitudinal axis 64 of the shaft 30 as the shaft 30 continues to rotate. Sudden vehicle deceleration causes the locking members 44 to engage and prevent rotation of the disc 40. Typically, the vehicle operator/passenger moves forward against the seatbelt during a sudden vehicle deceleration causing payout of the seat belt 14 and continued rotation of the spool or reel 22. Continued rotation of the spool or reel 22 moves the disc 40 inwardly towards the spool or reel 22.

Figure 7:
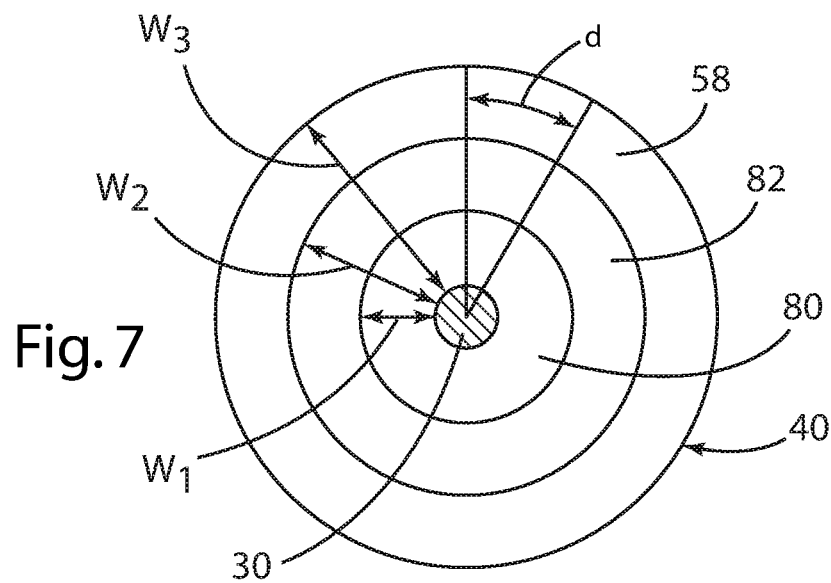
FIG. 7 is a schematic end view illustrating a friction surface of the energy absorbing mechanism as set forth in FIG. 2.

Since the spool or reel 22 rotates but does not move laterally when the disc 40 is driven into contact with the spool or reel 22 a certain/determinable frictional force is developed between spool or reel 22 and the disc 40. In the disclosed example, the disc 40 contacts or engages a flange 28 of the spool or reel 22. As illustrated, the disc 40 includes first and second layers 80, 82 of friction material on the inner or contact surface 58. The contact surface 58 of the disc 40 may contain a first layer of friction material 80 located adjacent the contact surface 58 of the disc 40. A second layer of friction material 82 is shown placed on or adjacent the first layer of friction material 80. It should be understood that additional layers of friction material may be placed on the contact surface 58 of the disc 40. The contact surface 58 of the disc may also function as a friction material; for example, the contact surface can have a roughened or configured surface designed to engage a friction plate 84 located adjacent the second flange 28 of the spool or reel 22. The friction plate 84 may also include one or more layers of friction material. FIG. 7 illustrates an example wherein each of the first, second layers of friction material 80, 82 and the contact surface 58 of the disc 40 each have an annular configuration with first or inner layer 80 having the smallest radial or annular width (w1) and with the remaining layer 82 and contact surface 58 having a greater radial or annular width (w2, w3) increasing in a stair step profile as shown in FIG. 7.

While illustrated example illustrates the disc 40 as having at least one or more layers of friction material, this is for exemplary purposes only as either one of or both the disc 40 or friction plate 84 may be devoid of friction material and have an engagement surface. Both the disc 40 and friction plate 84 may have one or more layers of friction material. While the layers of friction material 80, 82 of the disc 40 are formed of different materials, each having different friction coefficients and energy absorption characteristics, the layers 80, 82 may be formed of the same friction material, wherein the overall surface area of each of the layers is varied.

Energy absorption occurs by ablation of the friction material of each layer. The relative hardness, wear, surface area and frictional coefficient of each material will cause different energy absorption and ablation. Another example of the present invention includes each layer having different shear, tensile and compressive properties allowing different amounts of energy absorption as the material wears away. In addition, the first layer of frictional material 80 attached to the disc 40 may have a lower coefficient of friction and ablate rapidly exposing the second layer of friction material 82. Again, the properties or characteristics of the various layers of friction material can be changed or modified to achieve desired energy absorption. Further, as illustrated in FIG. 7 the greater the radial distance from the centerline or longitudinal axis 64 the greater the distance traveled (d) and the greater the energy absorbed for a friction material. As ablation depends in part on distance traveled, the present invention contemplates placing the friction materials at different distances from the center.

In another embodiment, changing the pitch of the threads 62 on the threaded portion 38 of the shaft 20 varies the compressive force exerted by the disc 40 on the friction plate 84. The compressive force is another parameter considered in determining the energy absorption and is another example of a mechanism for varying the compressive force.

The present invention illustrates one example of an apparatus for developing an energy absorption profile for use with a seat belt retractor. The apparatus provides multiple variable parameters any or all of which are used to achieve a force profile. In the present example, urging the disc 40 into engagement with the friction plate 84 develops a determinable friction force between the two. As the spool or reel 22, and correspondingly the friction plate 84, turns with the payout of the seat belt 14 the disc 40 is driven against the friction plate 84 by rotation of the shaft 30 absorbing energy due to the frictional force between the disc 40 and friction plate 84.

Further, the load limit or energy absorbing characteristics may be increased by varying the material of the respective friction layers. The first friction layer 80 may have a lower frictional force than the second friction layer 82 such that the load limit increases with each material. As the first friction 80 material is ablated, a greater force is required for relative rotation between the disc 40 and friction plate 84. Correspondingly, upon ablation of the second layer of frictional material 82, a greater force is required for relative rotation between the contact surface 58 of the spool or reel 22 and the friction plate 84 for relative rotation between the disc 40 in the spool or reel 22. In this manner, the energy absorbing retractor functions as a progressive load limiter. In an alternative example, if the frictional force of the multiple layers decreases then the energy absorbing retractor functions as a digressive load limiter.

Figure 8:
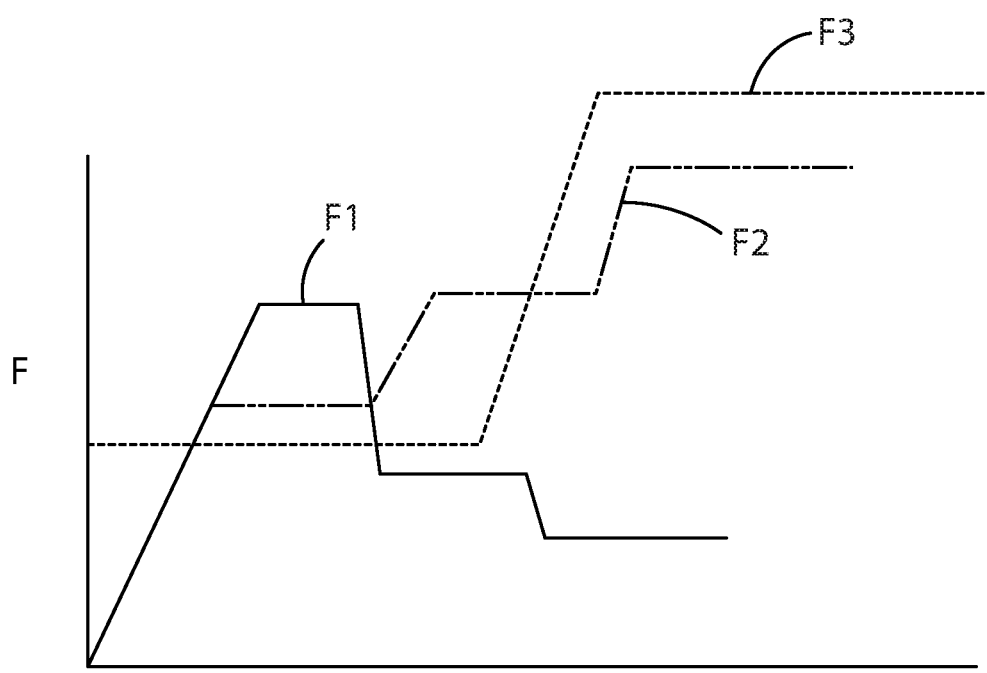
FIG. 8 is a graph illustrating an energy absorbing system for the present invention.

Turning to FIG. 8 there is shown a Force (F) versus Time (t) graph illustrating multiple force profiles F1, F2 and F3. F1 illustrating a digressive load limiter wherein the force decreases over time. F2 illustrating a progressive load limiter wherein the force increases over time. F3 illustrating a two level progressive load limiter wherein the force increases over time. These are examples and the force versus time profile need not be a straight line but may follow a curved or otherwise nonlinear profile. Varying the characteristics and parameters of the above-identified energy absorbing mechanism 36 enables the selection and use of a predetermined or preselected load limiting profile. Using the geometry of the pad or material on the disc, the material itself and the compressive force applied enables creation of virtually any force/time profile.

Another example of an energy absorbing mechanism 36 according to the present invention includes friction layers on both the friction plate 84 and the disc 40. The friction plate 84 may include multiple layers of friction material at various radial distances from the longitudinal axis 66 of the shaft 30. An additional example of another embodiment would include using the opposite flange 28 as the friction plate 84.

A further example includes the shaft 30 functioning as or being replaced by a torsion bar wherein as torsion bar rotates it urges the disc 40 into contact with the friction plate 84. Once relative rotation between the disc 40 and friction plate 84 ceases, the torsion bar twists or rotates to absorb any additional load.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for absorbing impact energy on a vehicle occupant comprising the steps of:
   providing a seat belt retractor having a reel for winding and unwinding a seat belt, the seat belt retractor including a housing, a shaft having a longitudinal axis rotatably supported by the housing, the shaft fixed against longitudinal movement relative to the housing, the reel secured to shaft against longitudinal movement with respect to the shaft and rotating with the shaft;
   providing a movable disc, wherein at least one of said reel and movable disc having a layer of friction material attached thereto; and
   moving said movable disc in the direction of the longitudinal axis towards said reel wherein engagement between the reel and the movable disc absorbs impact energy.

2. The method for absorbing impact energy on a vehicle occupant as set forth in claim 1 including moving said movable disc towards said reel in a manner results in a predetermined force profile.

3. The method for absorbing impact energy on a vehicle occupant as set forth in claim 1 including providing the reel and the movable disc with multiple layers of friction material, each layer having a different coefficient of friction whereby ablation of each layer varies energy absorption.

4. The method for absorbing impact energy on a vehicle occupant as set forth in claim 1 including providing a frangible connection between a shaft and said movable disc.

5. The method for absorbing impact energy on a vehicle occupant as set forth in claim 4 including a clutch mechanism wherein vehicle deceleration causes engagement between said clutch mechanism and said movable disc severs said frangible connection whereby continued rotation of said reel moves said movable disc toward said reel.

6. A method for absorbing impact energy on a vehicle occupant comprising the steps of:
   providing a seat belt retractor having a reel for winding and unwinding a seat belt;
   providing a movable disc, wherein at least one of said reel and movable disc having a layer of friction material attached thereto;
   moving said movable disc towards said reel in a manner such that the engagement between the reel and the movable disc absorbs impact energy; and
   providing a frangible connection between a shaft and said movable disc wherein said reel, said shaft, and said movable disc rotate together.

7. The method for absorbing impact energy on a vehicle occupant as set forth in claim 6 wherein said frangible connection includes an adhesive.

8. The method for absorbing impact energy on a vehicle occupant as set forth in claim 6 wherein said frangible connection includes a pin member.

9. The method for absorbing impact energy on a vehicle occupant as set forth in claim 6 wherein said frangible connection includes a polymer member.

10. A method for absorbing impact energy on a vehicle occupant comprising the steps of:
    providing a seat belt retractor having a reel for winding and unwinding a seat belt, said reel secured to and rotating with a shaft;
    providing a disc, securing said disc to said shaft with a frangible connection whereby said disc rotates with said shaft;
    providing at least one of said reel and disc with a layer of friction material attached thereto; and
    severing said frangible connection and moving said disc towards said reel in a manner such that the engagement between the reel and the disc absorbs impact energy.

11. The method for absorbing impact energy on a vehicle occupant as set forth in claim 10 including using a clutch mechanism to prevent said disc from rotating with said shaft whereby said disc moves axially along said shaft in the direction of a longitudinal axis of said shaft toward said reel.

12. The method for absorbing impact energy on a vehicle occupant as set forth in claim 10 including using a clutch mechanism to engage and prevent said disc from rotating with said shaft thereby severing said frangible connection.

13. The method for absorbing impact energy on a vehicle occupant as set forth in claim 10 wherein ablation of the friction material absorbs impact energy.

14. The method for absorbing impact energy on a vehicle occupant as set forth in claim 10 wherein moving said disc towards said reel in a manner results in a predetermined force profile.

15. The method for absorbing impact energy on the vehicle occupant as set forth in claim 10 including the step of providing the reel and the disc with multiple layers of friction material, each layer having a different coefficient of friction whereby ablation of each layer varies energy absorption.

* * * * *